US009719789B2

(12) United States Patent
Beaurepaire

(10) Patent No.: US 9,719,789 B2
(45) Date of Patent: Aug. 1, 2017

(54) METHOD AND APPARATUS FOR PROVIDING INTEGRATION OF ACCESS MANAGEMENT WITH NAVIGATION SYSTEMS

(71) Applicant: HERE Global B.V., Veldhoven (NL)

(72) Inventor: Jerome Beaurepaire, Berlin (DE)

(73) Assignee: HERE GLBOAL B.V., Veldhoven (NL)

( * ) Notice: Subject to any disclaimer, the term of this patent is extended or adjusted under 35 U.S.C. 154(b) by 0 days.

(21) Appl. No.: 14/949,389

(22) Filed: Nov. 23, 2015

(65) Prior Publication Data

US 2017/0146350 A1     May 25, 2017

(51) Int. Cl.
G01C 21/26     (2006.01)
G07C 9/00      (2006.01)
G01C 21/20     (2006.01)
G06F 17/30     (2006.01)
G06F 21/31     (2013.01)

(52) U.S. Cl.
CPC ....... *G01C 21/206* (2013.01); *G06F 17/3087* (2013.01); *G06F 17/30241* (2013.01); *G06F 21/31* (2013.01); *G07C 9/00166* (2013.01)

(58) Field of Classification Search
CPC combination set(s) only.
See application file for complete search history.

(56) References Cited

U.S. PATENT DOCUMENTS 6,278,935 B1 * 8/2001 Kaplan ................. G01C 21/26
                                                 235/384
6,321,161 B1 * 11/2001 Herbst ............... G01C 21/3415
                                                 340/905
6,463,384 B1 * 10/2002 Kaplan ................. G01C 21/26
                                                 235/384
7,606,558 B2   10/2009 Despain et al.
7,733,213 B2    6/2010 Levine (Continued)

FOREIGN PATENT DOCUMENTS

EP        1 321 741 A1    6/2003
EP        2 866 485 A1    4/2015
WO     2014095890 A1      6/2014

OTHER PUBLICATIONS

Zeng et al., "Security Visiting: RFID-Based Smartphone Indoor Guiding System", International Journal of Distributed Sensor Networks vol. 2014, Article ID 212741, Jan. 19, 2014, 10 Pages.

(Continued)

*Primary Examiner* — Yonel Beaulieu
(74) *Attorney, Agent, or Firm* — Ditthavong & Steiner, P.C.

(57) ABSTRACT

An approach is provided for acquiring access rights for one or more restricted access areas. The approach involves determining that at least one potential route for at least one user includes at least one location with one or more access restrictions. The approach also involves initiating at least one query to determine whether the at least one user has at least one access right to the at least one location. The approach further involves generating at least one request to acquire the at least one access right for the at least one user based, at least in part, on one or more results of the at least one query prior to travel in the at least one location, a commencement of the at least one potential route, or a combination thereof.

20 Claims, 15 Drawing Sheets

(56) References Cited

U.S. PATENT DOCUMENTS

| | | |
|---|---|---|
| 8,090,532 B2 | 1/2012 | Tashev et al. |
| 8,374,780 B2 | 2/2013 | Mays et al. |
| 2004/0193364 A1 | 9/2004 | Chojnacki |
| 2011/0153190 A1 | 6/2011 | Rolinski et al. |
| 2014/0253285 A1 | 9/2014 | Menzel |
| 2015/0012515 A1* | 1/2015 | Taichman ......... G06F 17/30887 707/706 |
| 2015/0054616 A1 | 2/2015 | Friedman et al. |

OTHER PUBLICATIONS

Schilling et al., "Design of flexible autonomous transport robots for industrial production", Proceedings of the IEEE International Symposium on Industrial Electronics, Jul. 7-11, 1997, vol. 3, pp. 791-796.

Notification of Transmittal of the International Search Report and the Written Opinion of the International Searching Authority, or the Declaration; International Search Report; Written Opinion of the International Searching Authority for corresponding International Application No. PCT/EP2016/077006, dated Feb. 7, 2017, 13 pages.

* cited by examiner

METHOD AND APPARATUS FOR PROVIDING INTEGRATION OF ACCESS MANAGEMENT WITH NAVIGATION SYSTEMS

BACKGROUND

Security intervention in restricted access areas hinders the ability of a user to travel with minimal interference. At present, the need to contact a person with access rights to enter the restricted access area is inefficient, and requires a level of coordination which is inconvenient for all involved parties. Because timeliness is imperative for users, service providers face significant technical challenges in developing mapping and/or navigation services that determines restricted access area within a route in real-time, and consequently requests for access credentials before a user initiates his/her travel towards the restricted access area.

SOME EXAMPLE EMBODIMENTS

Therefore, there is a need for an approach for acquiring access rights for one or more restricted access areas.

According to one embodiment, a method comprises determining that at least one potential route for at least one user includes at least one location with one or more access restrictions. The method also comprises initiating at least one query to determine whether the at least one user has at least one access right to the at least one location. The method further comprises generating at least one request to acquire the at least one access right for the at least one user based, at least in part, on one or more results of the at least one query prior to travel in the at least one location, a commencement of the at least one potential route, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine that at least one potential route for at least one user includes at least one location with one or more access restrictions. The apparatus is also caused to initiate at least one query to determine whether the at least one user has at least one access right to the at least one location. The apparatus is further caused to generate at least one request to acquire the at least one access right for the at least one user based, at least in part, on one or more results of the at least one query prior to travel in the at least one location, a commencement of the at least one potential route, or a combination thereof.

According to another embodiment, a computer-readable storage medium carries one or more sequences of one or more instructions which, when executed by one or more processors, cause, at least in part, an apparatus to determine that at least one potential route for at least one user includes at least one location with one or more access restrictions. The apparatus is also caused to initiate at least one query to determine whether the at least one user has at least one access right to the at least one location. The apparatus is further caused to generate at least one request to acquire the at least one access right for the at least one user based, at least in part, on one or more results of the at least one query prior to travel in the at least one location, a commencement of the at least one potential route, or a combination thereof.

According to another embodiment, an apparatus comprises means for determining that at least one potential route for at least one user includes at least one location with one or more access restrictions. The apparatus also comprises means for initiating at least one query to determine whether the at least one user has at least one access right to the at least one location. The apparatus further comprises means for generating at least one request to acquire the at least one access right for the at least one user based, at least in part, on one or more results of the at least one query prior to travel in the at least one location, a commencement of the at least one potential route, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for acquiring access rights for one or more restricted access areas are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to acquiring access rights for one or more restricted access areas, it is contemplated that the approach described herein may be applicable to any invention that can be modelled according the example processes described below.

Figure 1A:
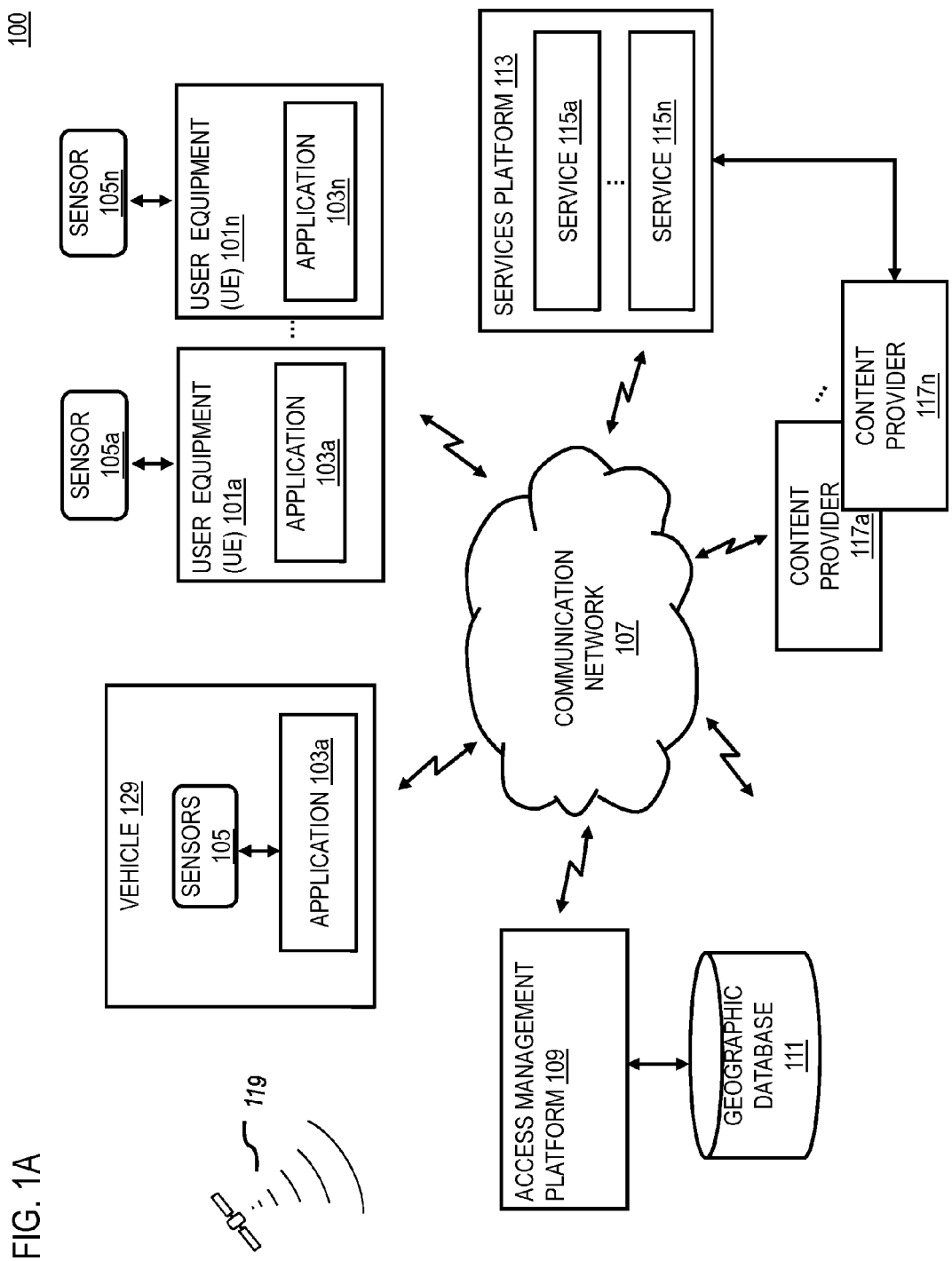
FIG. 1A is a diagram of a system capable of acquiring access rights for one or more restricted access areas, according to one example embodiment.

FIG. 1A is a diagram of a system capable of acquiring access rights for one or more restricted access areas, according to one embodiment. Security measures for private property, including granting rights to specific parties to access said property, are constantly evolving and becoming more sophisticated in order to meet the involved parties' respective time demands. Presently, the most common ways to access restricted areas requiring some form of physical key, PIN, or passcode verification is to contact a person with rights to those areas and request this information or physical key. In one scenario, a user visiting a gated community may waste time at the front door or at the parking entrance because he/she was never provided with the access code or the access rights. The only available solution for the user is to contact the authorized person to request this information, which is cumbersome and inefficient. Furthermore, these access rights cannot be easily revoked once passed onto a user, hence the user possesses the means to enter the restricted area outside of a specific time period.

To address these problems, system 100 of FIG. 1A introduces the capability to integrate access right management into the navigation system. The system 100 clears access rights related issues at the time at least one route to at least one destination is calculated. In one scenario, system 100 analyzes the computed route for restricted access areas in real-time, and makes timely requests for access rights by querying the needed entities when navigation starts. In one scenario, the system 100 makes the request in an integrated experience so that the user (e.g., a driver) just needs to accept sending this request to the friend he/she is visiting. This increases driver safety because the driver does not need to spend time calling or messaging his/her friend to request for access right and possibly writing down PIN codes. Further, system 100 may incorporate any response from the authorized user in the navigation system.

In another scenario, the system 100 may share at least one complete map with at least one user based, at least in part, on successful authentication of access credentials. The complete map may include at least one public map, at least one private map to the at least one point of interest within the at least one restricted access area, or a combination thereof. In a further scenario, the system 100 queries the access credentials to permit admission of at least one user through one or more entrances at the restricted access area that requires the access credentials.

As shown in FIG. 1A, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to an access management platform 109 via a communication network 107, e.g., a wireless communication network. In one embodiment, the access management platform 109 performs one or more functions associated with acquiring access rights for one or more restricted access areas.

As shown in FIG. 1A, the system 100 comprises of UE 101. In one embodiment, the UE 101 may include, but is not restricted to, any type of a mobile terminal, wireless terminal, fixed terminal, or portable terminal. Examples of the UE 101, may include, but are not restricted to, a mobile handset, a wireless communication device, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), a digital camera/camcorder, an infotainment system, a dashboard computer, a television device, or any combination thereof, including the accessories and peripherals of these devices, or any combination thereof. In one embodiment, the UE 101 may support any type of interface for supporting the presentment of one or more recommended routes towards at least one destination. In addition, the UE 101 may facilitate various input means for receiving and generating information, including, but not restricted to, a touch screen capability, a keyboard and keypad data entry, a voice-based input mechanism, and the like. Any known and future implementations of the UE 101 may also be applicable. In one embodiment, the UE 101 may be included, embedded within, or communicatively connected to the one or more vehicles (e.g., vehicle 129). In one embodiment, the at least one or more vehicles 129 includes at least one autonomous vehicle, at least one highly-assisted driving vehicle, or a combination thereof.

The UE 101 may further include applications 103. Further, the applications 103 may include various applications such as, but not restricted to, location-based service application, navigation application, content provisioning application, camera/imaging application, media player application, social networking application, calendar applications, multimedia application, and the like. In one embodiment, the applications 103 are installed within the UE 101. In one example embodiment, a location-based service application installed in the UE 101 enables the access management platform 109 to determine, for example, position, destination, heading, speed, context, identification, type, or any combination thereof, for one or more of the UE 101, such as vehicles. In another embodiment, the location-based service application installed in the UE 101 enables the access management platform 109 to determine at least one route towards a particular destination The system 100 also includes one or more sensors 105, which can be implemented, embedded or connected to the UE 101 and/or vehicle 129. The sensors 105 may be any type of sensor. In certain embodiments, the sensors 105 may include, for example, but not restricted to, a global positioning sensor for gathering location data, such as a Global Navigation Satellite System (GNSS) sensor, Light Detection And Ranging (LIDAR) for gathering distance data, a network detection sensor for detecting wireless signals or receivers for different short-range communications (e.g., Bluetooth, Wi-Fi, Li-Fi, Near Field Communication (NFC) etc.), temporal information sensors, a camera/imaging sensor for gathering image data, and the like. In another embodiment, the sensors 105 may include light sensors, oriental sensors augmented with height sensor and acceleration sensor (e.g., an accelerometer can measure acceleration and can be used to determine estimated time of arrival), tilt sensors, e.g. gyroscopes, to detect the degree of incline or decline of the vehicle along a path of travel, an electronic compass to detect a compass direction, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors 105 may detect weather data, road condition, traffic information, or a combination thereof. In one example embodiment, the UE 101 may include Global Positioning System (GPS) receivers to obtain geographic coordinates from satellites 119 for determining current location and time associated with the UE 101. Further, the location can be determined by an Assisted Global Positioning (A-GPS), Cell of Origin, a wireless signal triangulation system, or other location extrapolation technologies. In another example embodiment, the one or more sensors may provide in-vehicle navigation services, wherein one or more location based services may be provided to the at least one UE 101 associated with the at least one user of the vehicle and/or at least one other UE 101 associated with the at least one vehicle 129. In one example embodiment, the one or more sensors 105 in the UE 101 or vehicle 129 enable determination, for example, position, destination, speed, type and identification, or any combination thereof, for the UE 101 or vehicle 129. In another embodiment, the one or more sensors 105 enable determination of the status situation in one or more road segments, such as traffic or weather. In another embodiment, the one or more sensors 105 enable determination of context of the UE 101 or vehicle 129.

Further, various elements of the system 100 may communicate with each other through a communication network 107. The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular communication network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), vehicle controller area network (CAN bus), and the like, or any combination thereof.

In one embodiment, the access management platform 109 may be a platform with multiple interconnected components. The access management platform 109 may include one or more servers, intelligent networking devices, computing devices, components and corresponding software for acquiring access rights for one or more restricted access areas. In addition, it is noted that the access management platform 109 may be a separate entity of the system 100, a part of the one or more services 115*a*-115*n* (collectively referred to as services 115) of the services platform 113, or the UE 101.

In one embodiment, the access management platform 109 may identify one or more restricted access area(s) along the route. Then, the access management platform 109 may query whether the at least one user has the required permission to access the at least one access restricted location. The access management platform 109 may determine that the at least one user does not have the required permission, whereupon the access management platform 109 requests for access rights from an authorized user before the user embarks towards a particular destination and/or when the navigation starts. In one example embodiment, when a visitor (User A) enters the destination information (e.g., home location of user B) in a navigation application, the routing algorithm checks whether there is any area with restricted access on the suggested route. If restricted areas exist, and user A does not have access rights, the application automatically sends a request to the authorizing party (User B) for access rights to enter the restricted area. Subsequently, after receiving the access rights from authorizing party, the visitor can view indoor map data of the building. In another embodiment, the access management platform 109 may determine whether the at least one user is authorized to share the at least one route within a private venue and/or grant access right to a private venue.

In one embodiment, the access management platform 109 may check for restricted access area(s) before reaching the final destination and may display them on the navigation application of a UE 101 or vehicle 129. The access management platform 109 may make timely requests from the authorizing party for access rights to enter the restricted access areas. In one scenario, if access is granted, end to end route is unlocked for the visitor. In another scenario, if the request is pending, visitor can either choose to cancel the trip or delay the trip or call the authorizing party. In a further scenario, if the access is denied, the navigation is suspended.

It is contemplated that the approach described herein may be applicable to any services. In one scenario, the access management platform 109 may provide at least one user with access to one or more services. In one example embodiment, the access management platform 109 may provide at least one user with access to a restaurant database based, at least in part, on access credentials. Then, the at least one user may check for availability of reservation before making plans at the restaurant.

In one embodiment, the geographic database 111 may store and manage data for one or more restricted access areas, access credentials to the one or more restricted access areas, or a combination thereof. The information may be any multiple types of information that can provide means for aiding in the content provisioning and sharing process.

The services platform 113 may include any type of service. By way of example, the services platform 113 may include mapping services/application, navigation services/application, travel planning services/application, route calculation services/application, notification services/application, social networking services/application, content (e.g., audio, video, images, etc.) provisioning services/application, application services/application, storage services/application, contextual information determination services/application, location based services/application, information (e.g., weather, news, etc.) based services/application, etc. In one embodiment, the services platform 113 may interact with the UE 101, the access management platform 109 and the content provider 117 to supplement or aid in the processing of the content information. In one embodiment, the services platform 113 may be implemented or embedded in the access management platform 109 or in its functions.

By way of example, the services 115 may be an online service that reflects interests and/or activities of users. The services 115 allow users to share contact information, location information, activities information, contextual information, historical user information and interests within their individual networks, and provides for data portability. The services 115 may additionally assist in providing the access management platform 109 with information on travel plans of at least one user, activity information of at least one user, user profile information, and a variety of additional information.

The content providers 117*a*-117*n* (collectively referred to as content provider 117) may provide content to the UE 101, the vehicle 129, the access management platform 109, and the services 115 of the services platform 113. The content provided may be any type of content, such as, image content, textual content, audio content (e.g., audio notification), video content (e.g., visual notification), etc. In one embodiment, the content provider 117 may provide content that may supplement content of the applications 103, the sensors 105, or a combination thereof. In another embodiment, the content provider 117 may provide or supplement the mapping services/application, navigation services/application, travel planning services/application, route calculation services/application, notification services/application, social networking services/application, content (e.g., audio, video, images, etc.) provisioning services/application, application services/application, storage services/application, contextual information determination services/application, location based services/application, information (e.g., weather, news, etc.) based services/application, local map data, or any combination thereof. In a further embodiment, the content provider 117 may also store content associated with the UE 101, the access management platform 109, and the services 115 of the services platform 113. In another embodiment, the content provider 117 may manage access to a central repository of data, and offer a consistent, standard interface to data, such as, a repository of information for location information for one or more road segments (e.g., restricted access areas) and so on. Any known or still developing methods, techniques or processes for acquiring access rights for one or more restricted access areas may be employed by the access management platform 109.

By way of example, the UE 101, the access management platform 109 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
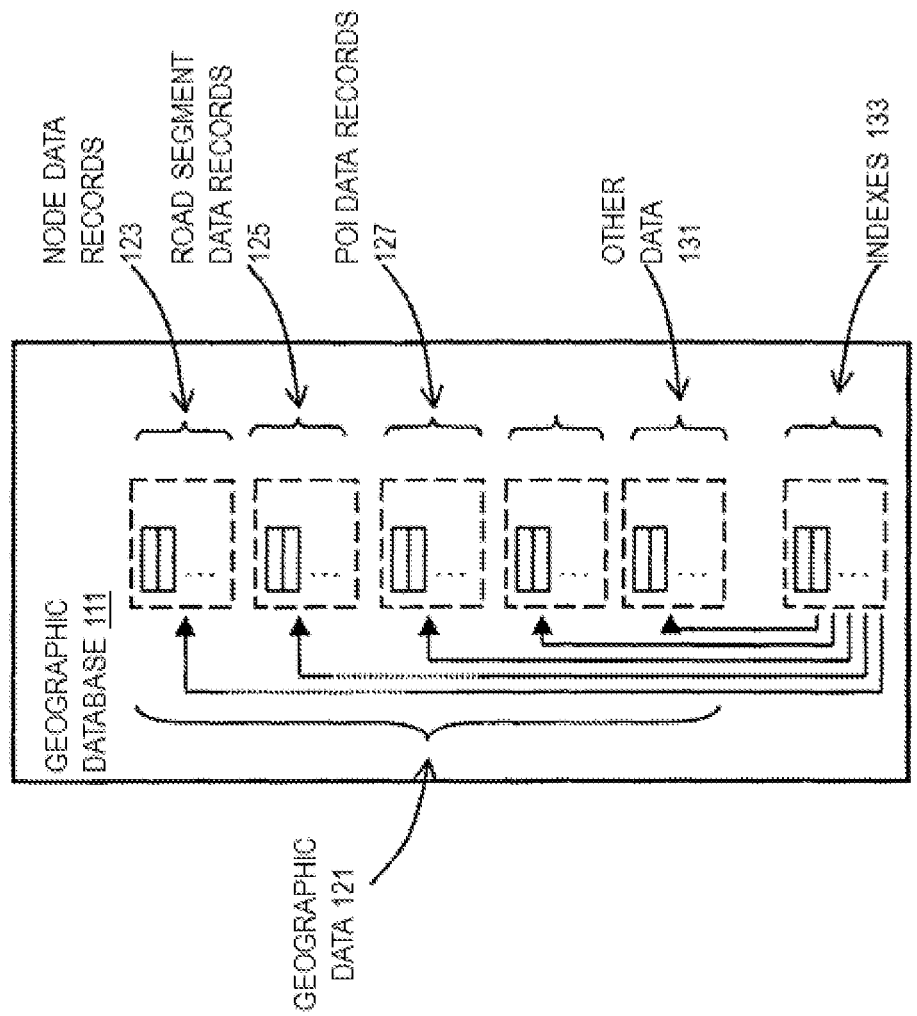
FIG. 1B is a diagram of the geographic database 111 of system 100, according to exemplary embodiments.

FIG. 1B is a diagram of the geographic database 111 of system 100, according to exemplary embodiments. In the exemplary embodiments, POIs and map generated POIs data can be stored, associated with, and/or linked to the geographic database 111 or data thereof. In one embodiment, the geographic or map database 111 includes geographic data 121 used for (or configured to be compiled to be used for) mapping and/or navigation-related services, such as for personalized route determination, according to exemplary embodiments. For example, the geographic database 111 includes node data records 123, road segment or link data records 125, POI data records 127, and other data records 131, for example. More, fewer or different data records can be provided. In one embodiment, the other data records 131 include cartographic ("carto") data records, routing data, traffic signal data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 125 are links or segments representing roads, streets, parking areas, or paths, as can be used in the calculated route or recorded route information for determination of one or more personalized routes, according to exemplary embodiments. The node data records 123 are end points corresponding to the respective links or segments of the road segment data records 125. The road link data records 125 and the node data records 123 represent a road network, such as used by vehicles, cars, and/or other entities. Alternatively, the geographic database 111 can contain path segment and node data records or other data that represent pedestrian paths or areas in addition to or instead of the vehicle road record data, for example.

The road link and nodes can be associated with attributes, such as geographic coordinates, traffic lights, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 111 can include data about the POIs and their respective locations in the POI data records 127. The geographic database 111 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city). By way of example, a street is determined from the user interaction with the UE 101 and the content information associated with the UE 101, according to the various embodiments described herein.

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities (e.g., schedules for traffic light signals). In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UEs 101) to provided navigation-related functions. For example, the geographic database 111 can be used with the UE 101 to provide an end user with navigation features. In such a case, the geographic database 111 can be downloaded or stored on the UE 101, such as in the applications 103, or the UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions, for example, travelling in a route with restricted access area.

Figure 2:
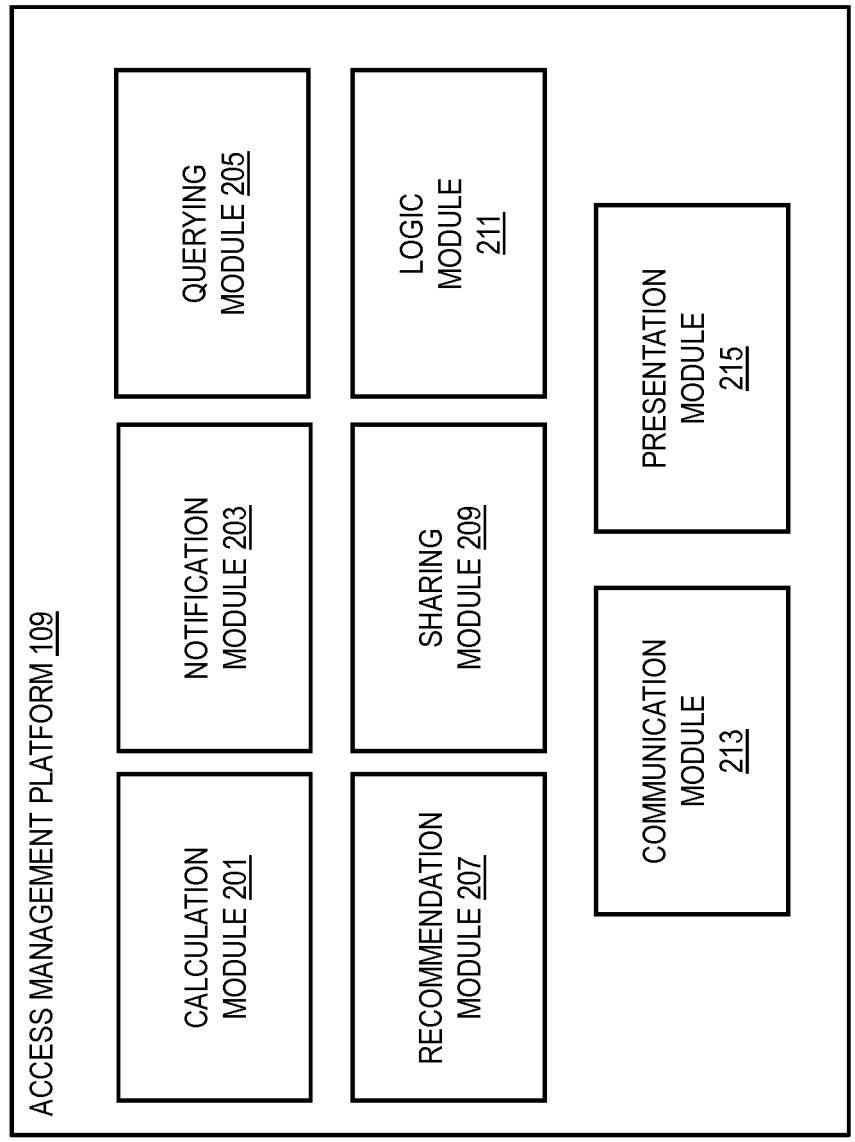
FIG. 2 is a diagram of the components of the access management platform 109, according to one example embodiment.

FIG. 2 is a diagram of the components of the access management platform 109, according to one example embodiment. By way of example, the access management platform 109 may include one or more components for acquiring access rights for one or more restricted access areas. In one embodiment, the access management platform 109 may include calculation modules 201, notification module 203, querying modules 205, recommendation modules 207, sharing module 209, logic modules 211, communication modules 213, and presentation modules 215. It is contemplated that the functions of these components may be combined in one or more components or performed by other components with similar functionalities.

In one embodiment, the calculation module 201 may calculate at least one route based, at least in part, on a request by at least one user to initiate route calculation to at least one destination. Then, the calculation module may determine at least one route segment within at least one restricted access area in the at least one route. In another embodiment, the calculation module 201 may determine one or more entrances within the at least one restricted access area that requires access credentials. In a further embodiment, the calculation module 201 may process travel patterns, activity information, or a combination thereof associated with at least one device to predict one or more routes and/or destination. In one scenario, at least one destination may be manually entered or may be anticipated by the calculation module 201.

In one embodiment, the notification module 203 may cause a request notification in at least one device associated with at least one user authorized to grant access to the at least one restricted access area. In another embodiment, the notification module 203 may cause a notification in the at least one device associated with at least one user based, at least in part, on acceptance of at least one access request, rejection of the at least one access request, non-responsiveness to the at least one access request, or a combination thereof by at least one user authorized to grant access. In a further embodiment, the notification module 203 may cause a request notification for new access credentials in the at least one device associated with at least one user authorized to grant access. In another embodiment, the notification module 203 may cause a notification in at least UE 101 of the at least one authorized user to grant access that at least one access requesting user has arrived at the destination.

In one embodiment, the querying module 205 may verify access credentials for at least one restricted access area. In one scenario, the querying module 205 may approve sharing of the mapping information for the at least one route segment within the at least one restricted access area based, at least in part, on successful validation of the access credentials. The access credentials may include a temporary access credentials with a time window of validity based, at least in part, on the estimated time of arrival for the at least one user. In another embodiment, the querying module 205 may verify access credentials to permit admission of at least one user through one or more entrances of the at least one restricted access area. The querying module 205 may approve admission to the at least one restricted access area based, at least in part, successful authentication of the access credentials. In one scenario, the access credentials may include a security token (a virtual token), a quick response (QR) code, a preset username and a password combination, a pin code, other authentication mechanisms, or a combination thereof. In a further embodiment, the querying module 205 may determine capability of at least one user granting access to the at least one restricted access area. In one scenario, the querying module may cancel access request and/or access credential based, at least in part, on a determination that at least one user is not authorized to grant access, expiration of access credentials, or a combination thereof.

In one embodiment, the recommendation module 207 may cause a recommendation of one or more alternate options to at least one user based, at least in part, on the rejection of the at least one access request. In one scenario, the one or more alternate options include cancellation of a travel, re-routing to the residential address of the at least one user, rerouting to a starting point of the travel, or a combination thereof. In another embodiment, the recommendation module 207 may cause a recommendation of one or more alternate options to at least one user based, at least in part, on the non-responsiveness to the at least one access request. In one scenario, the one or more alternate options include delaying an estimated time of arrival for the at least one user, continuing the travel up to public access points, or a combination thereof.

In one embodiment, the sharing module 209 may share partial or complete mapping information with at least one user. In one scenario, the complete mapping information may include at least one public map information, at least one private map information to at least one point of interest within the at least one restricted access area, or a combination thereof. In one scenario, at least one user may be provided with mapping information in a need to know basis. In one example embodiment, user B may grant access credentials to user A, so that user A can visit user B's house within the gated community. The access management platform 109 may provide user A with access to a particular segment of the entire gated area, and may restrict the routing towards the destination (i.e., house of user B). In another embodiment, the sharing module 209 may cause a sharing of mapping information and navigation information between different devices (e.g., navigation system in a vehicle, navigation system of a mobile device, etc.).

In one embodiment, the logic module 211 may manage tasks, including tasks performed by the other modules. For example, although the other modules may perform their actual tasks, the logic module 211 may determine when and how those tasks are performed or otherwise direct the other modules to perform the task.

The communication module 213 may be used for communication between various elements of the system 100 as well as between modules, elements, components, etc. of the access management platform 109. For example, the communication module 213 may be used to communicate commands, access requests, access credentials, etc., to/from the UE 101, access management platform 109, database 111, the content provider 117, or the like. In one embodiment, the access management platform 109 may via sensors 105 determine proximity information between the at least one device associated with the at least one user and the at least one restricted access area. Then, the communication module 213 may cause an initiation of a communication session, wherein the communication session may include a near field communication (NFC) session.

In one embodiment, the presentation module 215 obtains a set of summary statistics and/or updates from the other modules. In one scenario, the presentation module 215 continues with generating a presentation of at least one notification in one or more UE 101s requesting for access credentials. In another scenario, the presentation module 215 may cause a presentation of notification regarding granting, rejection, pending, or a combination thereof of access requests in the one or more UE 101s. In one example embodiment, the presentation module 215 may cause a presentation wherein at least one recommended route may be highlighted. The presentation may also incorporate temporal information (e.g., estimated time of arrival), traffic density information (e.g., number of vehicles nearby), and so on alongside a selected route.

The above presented modules and components of the access management platform 109 can be implemented in hardware, firmware, software, or a combination thereof. Though depicted as a separate entity in FIG. 1A, it is contemplated that the access management platform 109 may be implemented for direct operation by respective UE 101. As such, the access management platform 109 may generate direct signal inputs by way of the operating system of the UE 101 for interacting with the applications 103. In another embodiment, one or more of the modules 201-215 may be implemented for operation by respective UEs, as the access management platform 109, or combination thereof. Still further, the access management platform 109 may be integrated for direct operation with the services 115, such as in the form of a widget or applet, in accordance with an information and/or subscriber sharing arrangement. The various executions presented herein contemplate any and all arrangements and models.

Figure 3:
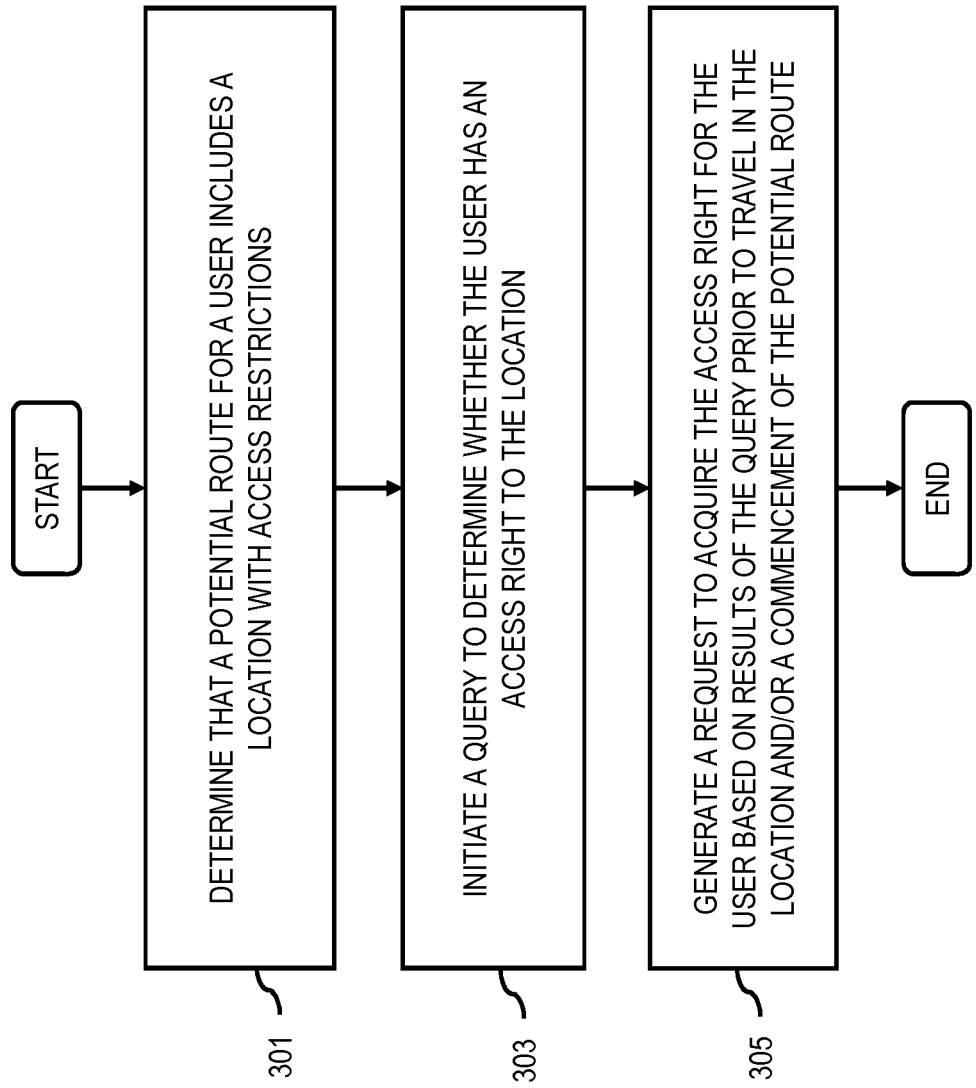
FIG. 3 is a flowchart of a process for acquiring access rights for one or more restricted access areas, according to one example embodiment.
Figure 13:
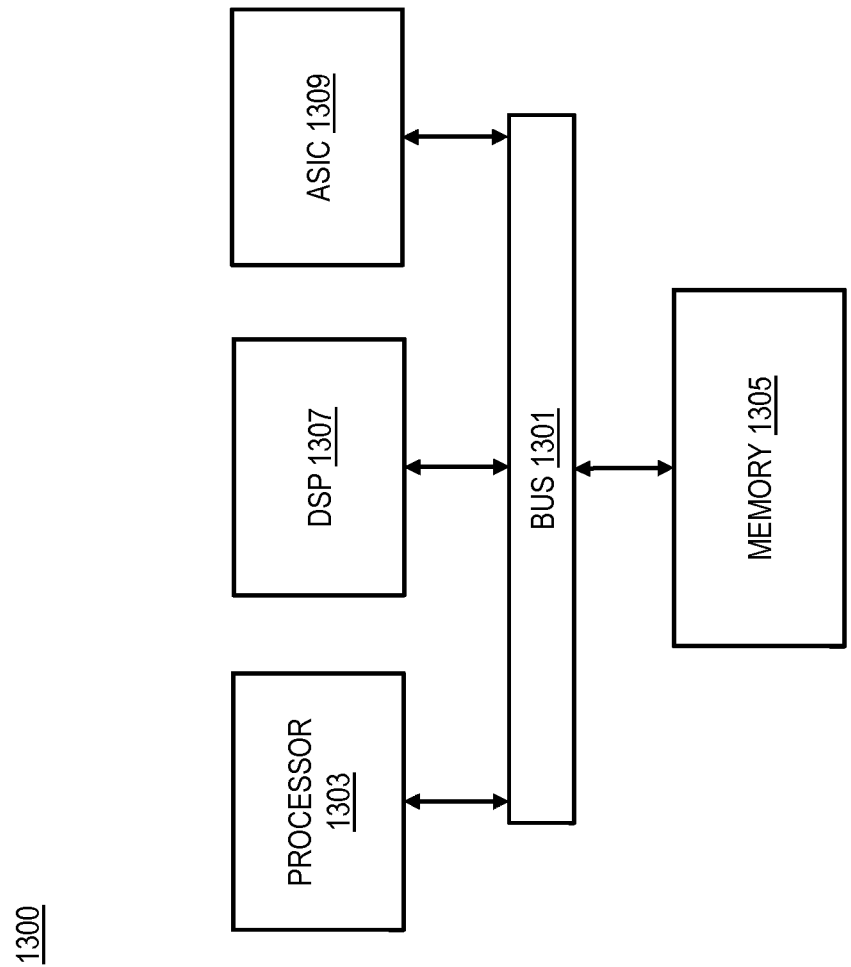
FIG. 13 is a diagram of a chip set that can be used to implement an embodiment of the invention.

FIG. 3 is a flowchart of a process for acquiring access rights for one or more restricted access areas, according to one example embodiment. In one embodiment, the access management platform 109 performs the process 300 and is implemented in, for instance, a chip set including a processor and a memory as shown in FIG. 13.

In step 301, the access management platform 109 may determine that at least one potential route for at least one user includes at least one location with one or more access restrictions. In one example embodiment, user A decides to visit user B who lives in a gated community. Then, user A may enter user B's location information in the navigation system, whereupon the navigation system calculates at least one route towards user B's location. Subsequently, the access management platform 109 may determine at least one route segment with access restrictions within the at least one route towards user B's location.

In step 303, the access management platform 109 may initiate at least one query to determine whether the at least one user has at least one access right to the at least one location. In one example embodiment, the access management platform 109 may determine whether user A has access rights to enter a gated community because user A may be requested to provide access credentials at the entrance of the gated community. In one scenario, the access management platform 109 may process user profile information and/or contextual information of user A to determine whether user A has the access rights.

In step 305, the access management platform 109 may generate at least one request to acquire the at least one access right for the at least one user based, at least in part, on one or more results of the at least one query prior to travel in the at least one location, a commencement of the at least one potential route, or a combination thereof. In one example embodiment, the access management platform 109 may determine that user A planning on entering a gated community is not a resident of the gated community and does not have the access rights. Subsequently, the access management platform 109 may generate a request notification in at least one UE 101 of the at least one resident of the gated community (e.g., user B whom user A is visiting) for granting access rights to user A. In one scenario, the request notification may be generated before user A travels towards the gated community and/or during route calculation.

Figure 4:
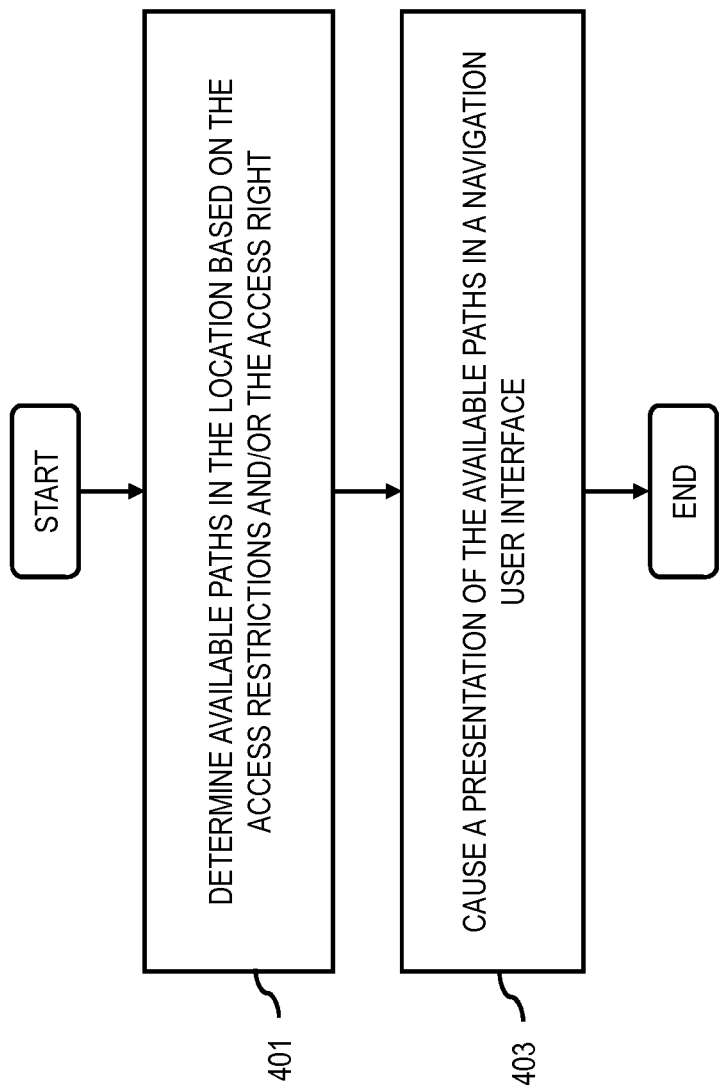
FIG. 4 is a flowchart of a process for determining available paths in at least one restricted access area, according to one example embodiment.

FIG. 4 is a flowchart of a process for determining available paths in at least one restricted access area, according to one example embodiment. In one embodiment, the access management platform 109 performs the process 400 and is implemented in, for instance, a chip set including a processor and a memory as shown in FIG. 13.

In step 401, the access management platform 109 may determine one or more available paths in the at least one location based, at least in part, on the one or more access restrictions, the at least one access right, or a combination thereof. In one embodiment, the access management platform 109 may share map information for a private venue with an external user based, at least in part, on access rights granted to the external user. In one example embodiment, user A with limited access rights to visit user B in a gated community may be provided with partial map information towards user B's residence. The access management platform 109 may guide user A to user B's residence, thereby ensuring that user A does not deviate from the assigned route.

In step 403, the access management platform 109 may cause, at least in part, a presentation of the one or more available paths in at least one navigation user interface. In one example embodiment, as a user plans to travel in a route either completely or partially in a private venue. The access management platform 109 may recognize path(s) inside the private venue that can be shared with the user with current access permissions. The access management platform 109 may cause a presentation of the path in a navigation user interface, wherein the path may be highlighted for user convenience.

Figure 5:
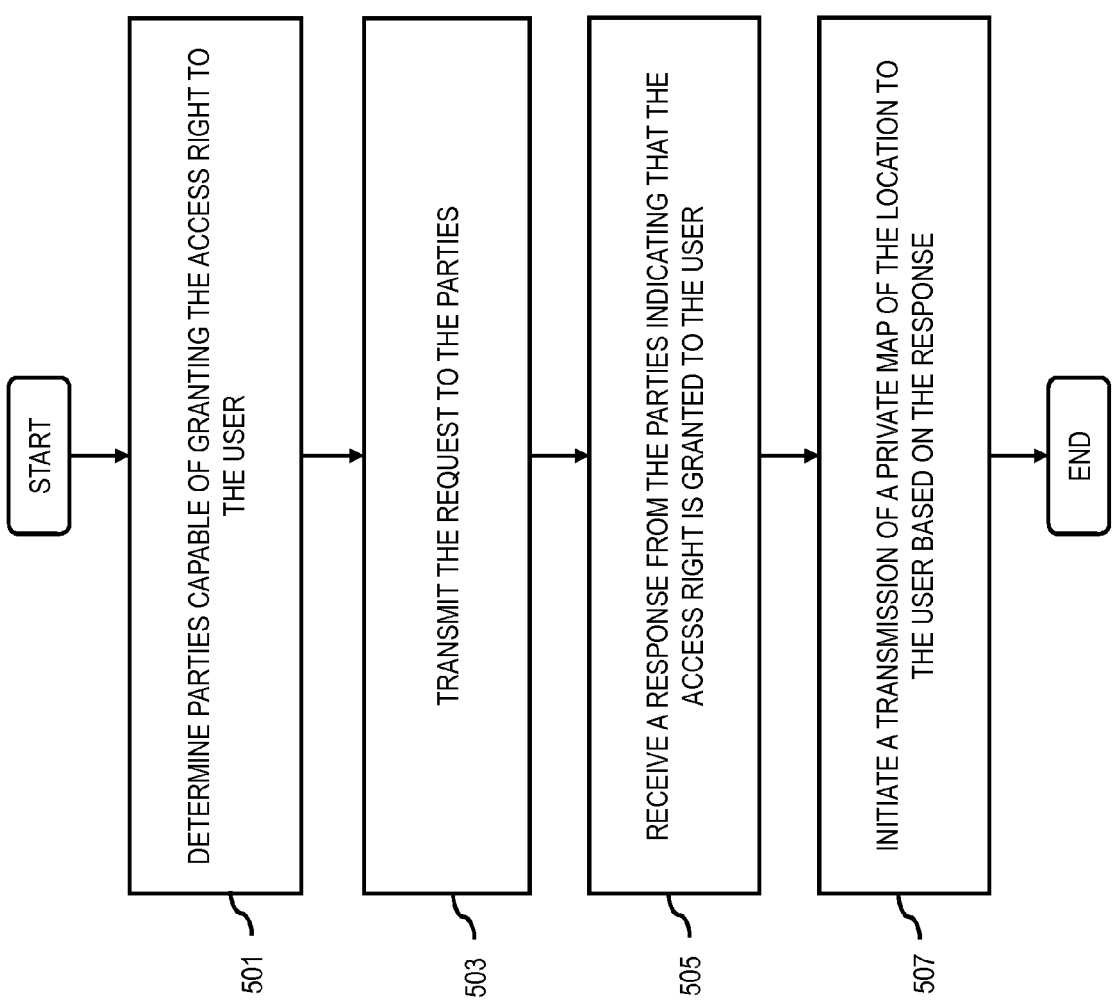
FIG. 5 is a flowchart of a process for acquiring access credentials from at least one authorized user, according to one example embodiment.

FIG. 5 is a flowchart of a process for acquiring access credentials from at least one authorized user, according to one example embodiment. In one embodiment, the access management platform 109 performs the process 500 and is implemented in, for instance, a chip set including a processor and a memory as shown in FIG. 13.

In step 501, the access management platform 109 may determine one or more parties capable of granting the at least one access right to the at least one user. In one example embodiment, the access management platform 109 may request access permissions from authorized users potentially interested in granting access permission to the external user. In one scenario, authorized users may include users with access rights (e.g., residents) to at least one restricted access area, users who are capable of granting access permissions to the at least one restricted access area, or a combination thereof. In another scenario, the at least one authorized user may request another authorized user to grant access on his/her behalf. In one example embodiment, user A, a resident of the gated community may possess a right forwarding capability and may request his wife or neighbor to grant access to the external user B on his behalf.

In step 503, the access management platform 109 may transmit the at least one request to the one or more parties. In one example embodiment, the access management platform 109 may cause a presentation of at least one request notification for access credentials in at least one UE 101 of the at least one user authorized to grant access rights.

In step 505, the access management platform 109 may receive a response from the one or more parties indicating that the at least one access right is granted to the at least one user. In one example embodiment, at least one user authorized to grant access rights may provide access credentials to at least one external user. Then, the external user may provide the access credentials at the entry point to access the restricted access area.

In step 507, the access management platform 109 may initiate a transmission of at least one private map of the at least one location to the at least one user based, at least in part, on the response. In one example embodiment, the access management platform 109 may provide an external user with partial map to a private venue, the required access credentials and the navigation instructions inside the private venue, or a combination thereof based, at least in part, on the access rights granted. In one embodiment, the transmission of the at least one private map further includes, at least in part, one or more access credentials for use by the at least one user for travel in the at least one location. In one example embodiment, at least one private venue map may be attached with (temporary) access credentials for the gateway(s) restricting access to the destination point.

Figure 6:
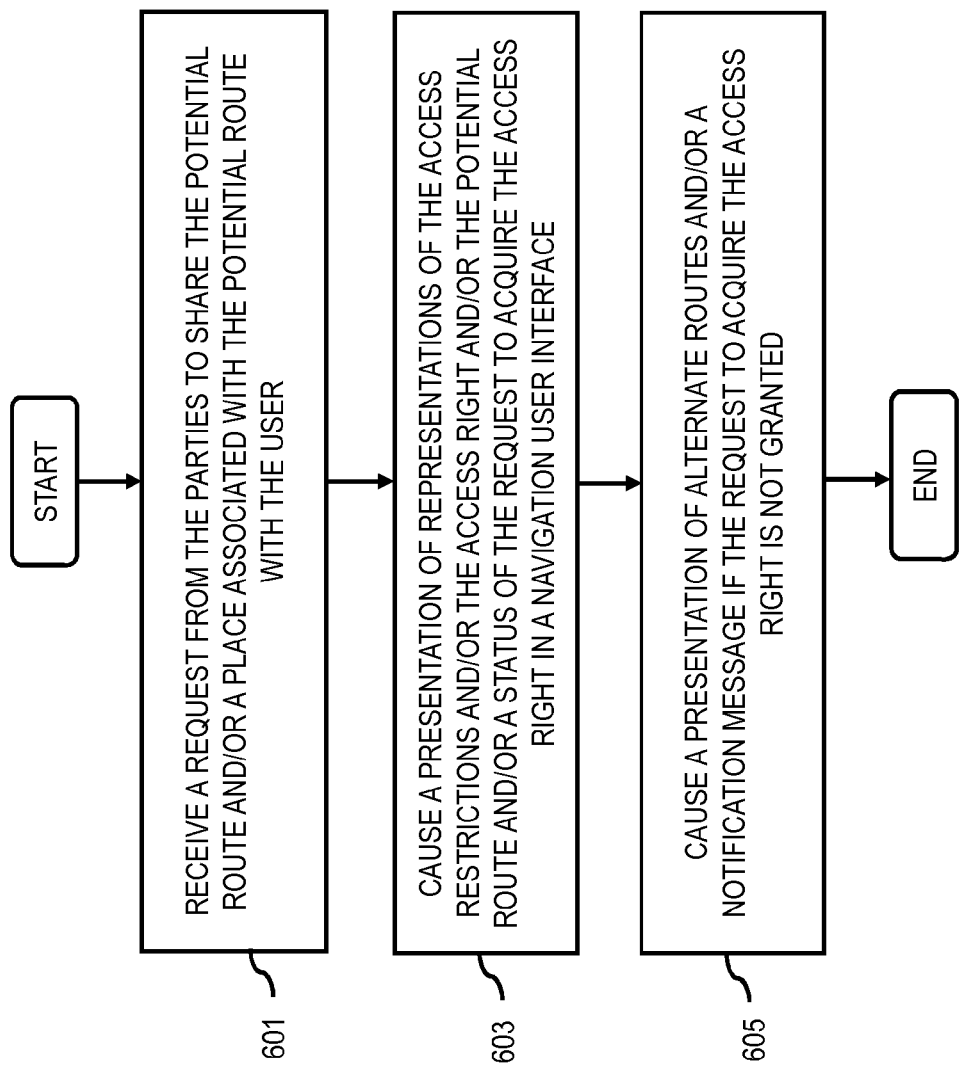
FIG. 6 is a flowchart of a process for determining capability of at least one authorized user, and causing at least one presentation pursuant to action undertaken by the authorized user, according to one example embodiment.

FIG. 6 is a flowchart of a process for determining capability of at least one authorized user, and causing at least one presentation pursuant to action undertaken by the authorized user, according to one example embodiment. In one embodiment, the access management platform 109 performs the process 600 and is implemented in, for instance, a chip set including a processor and a memory as shown in FIG. 13.

In step 601, the access management platform 109 may receive a request from one or more parties to share the at least one potential route, at least one place associated with the at least one potential route, or a combination thereof with the at least one user. In one embodiment, a transmission of the at least one potential route or the at least one place to the at least one user, is based, at least in part, on determining whether the one or more parties are authorized to share the at least one route, to grant the at least one access right, or a combination thereof. In one example embodiment, user A may shares a location with user B. The access management platform 109 may detect that this location is within a gated area. Then, the access management platform 109 may query user A whether he/she wishes to grant the needed access rights to user B to reach this location. If user A responds positively, the access management platform 109 may check whether user A has the necessary rights to grant access (e.g., Does he/she live there?). Then, the access management platform 109 may optionally ask details regarding the validity of this access grant (e.g., for one day, for one week, one time use, expiry by a given date, etc.). Subsequently, user B may be notified that access rights has been granted to navigate to the gated area (with the possible validity period). In another embodiment, initiating at least one query, generating at least one request to acquire the at least one access right, or a combination thereof is based, at least in part, on determining whether the one or more parties are authorized to share the at least one route, to grant the at least one access right, or a combination thereof. In one example embodiment, user A shares a route with user B (e.g., this is how you travel from ABC street to user A's villa on the seaside). Then, the access management platform 109 detects that part(s) of the route is/are inside a gated area. The access management platform 109 queries user A whether he/she wishes to grant all the needed access rights to B along this route? If user A responds positively, the access management platform 109 may check whether user A has the necessary rights to grant access (e.g., does he/she have all the needed access rights and can he/she forward them to somebody else?). Further, the access management platform 109 may optionally ask details about the validity of this access grant (for one day, for one week, one time use, expire in any case by a given date, etc.). Subsequently, user B is informed when receiving this place that he/she got the access rights granted to navigate till the final destination (with the possible limitations, i.e., possible validity period).

In step 603, the access management platform 109 may cause, at least in part, a presentation of one or more representations of the one or more access restrictions, the at least one access right, the at least one potential route, a status of the at least one request to acquire the at least one access right, or a combination thereof in at least one navigation user interface. In one example embodiment, an external user may be notified regarding an acceptance, or a denial, or a pending status of an access request. In another example embodiment, an authorized user may grant access request to an external user, whereupon the external user may be presented with a complete map (i.e., end to end route may be unlocked till the destination). Further, the relevant routes in the map may be presented in color. In a further example embodiment, the access management platform 109 may recommend at least one external user to take corrective action (e.g., cancel the trip, delay his/her time of arrival, call authorized user) if the access request is still pending.

In step 605, the access management platform 109 may cause, at least in part, a presentation of one or more alternate routes, at least one notification message, or a combination thereof if the at least one request to acquire the at least one access right is not granted. In one example embodiment, the access management platform 109 may determine that the authorized user has denied access to the at least one external user. Then, the access management platform 109 may recommend certain remedial actions for the external users, for example, stopping navigation, proposing an alternate route home if the external user has started driving, suggesting a route till the entrance of the restricted access area if the user continues with the travel, etc.

Figure 7:
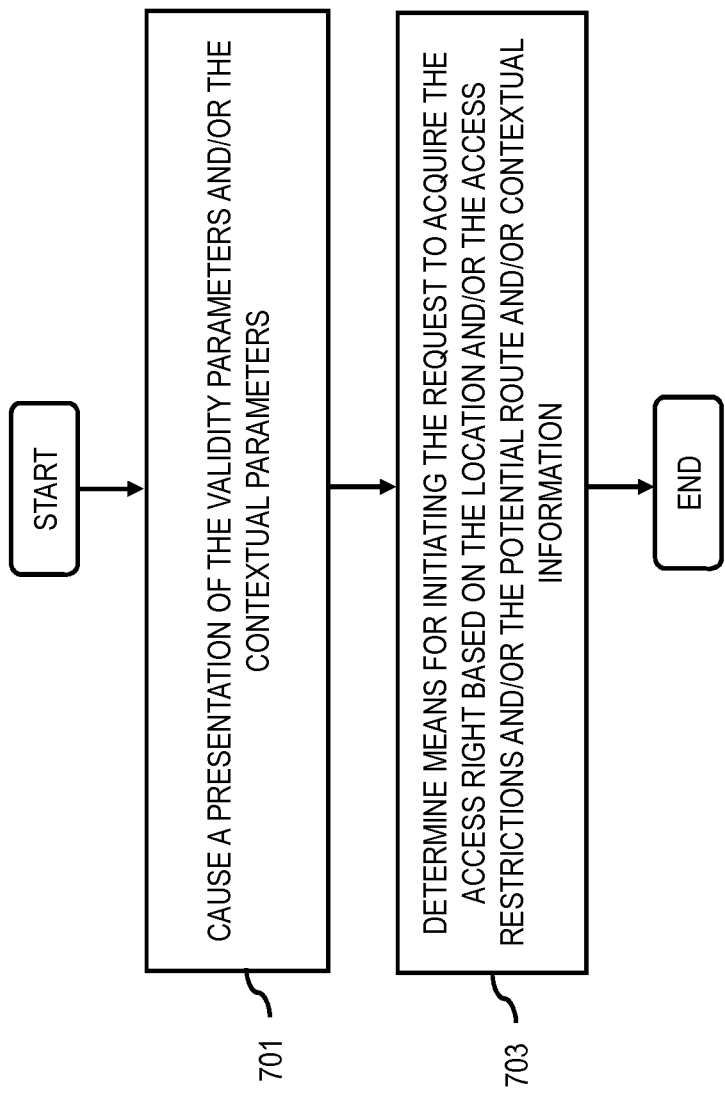
FIG. 7 is a flowchart of a process for acquiring access rights based, at least in part, on parameters and/or location information, according to one example embodiment.

FIG. 7 is a flowchart of a process for acquiring access rights based, at least in part, on parameters and/or location information, according to one example embodiment. In one embodiment, the access management platform 109 performs the process 700 and is implemented in, for instance, a chip set including a processor and a memory as shown in FIG. 13.

In step 701, the access management platform 109 may cause, at least in part, a presentation of the one or more validity parameters, the one or more contextual parameters, or a combination thereof. In one embodiment, the one or more access restrictions, the at least one access right, or a combination thereof is based, at least in part, on one or more validity parameters, one or more contextual parameters, or a combination thereof. In one example embodiment, at least one access right may be time-limited. The access right may be valid for a day, for an hour, during certain time of the day, for the estimated time of arrival of the external user, and so on. In another example embodiment, the access right may be valid for a single use or for multiple use (e.g., twice) by the external user. In a further example embodiment, a user decides to navigate to a particular location few days after receiving the place/route. Then, the navigation system queries the access management platform 109 to check whether the access rights are still valid. If the access rights are valid, the user is subtly informed that the background check has been done successfully and the end to end navigation can be done. If the query fails due to expired access rights, the user is promptly informed so that he/she can take the right action (i.e., request new access rights or cancel the navigation). In another example embodiment, at least one building may be public during office hours (e.g., 9 a.m.-5 p.m.) but requires access rights beyond the office hours. The access management platform 109 may take into consideration the contextual parameters of the building, and may request for access rights for any users trying to access the building beyond regular office hours.

In step 703, the access management platform 109 may determine one or more means for initiating the at least one request to acquire the at least one access right based, at least in part, on the at least one location, the one or more access restrictions, that least one potential route, contextual information, or a combination thereof. In one example embodiment, the access management platform 109 may determine proximity information between a user and at least one destination via sensors 105. Then, the access management platform 109 may utilize near field technology (NFC) to initiate request for access credentials for the restricted access areas.

Figure 8:
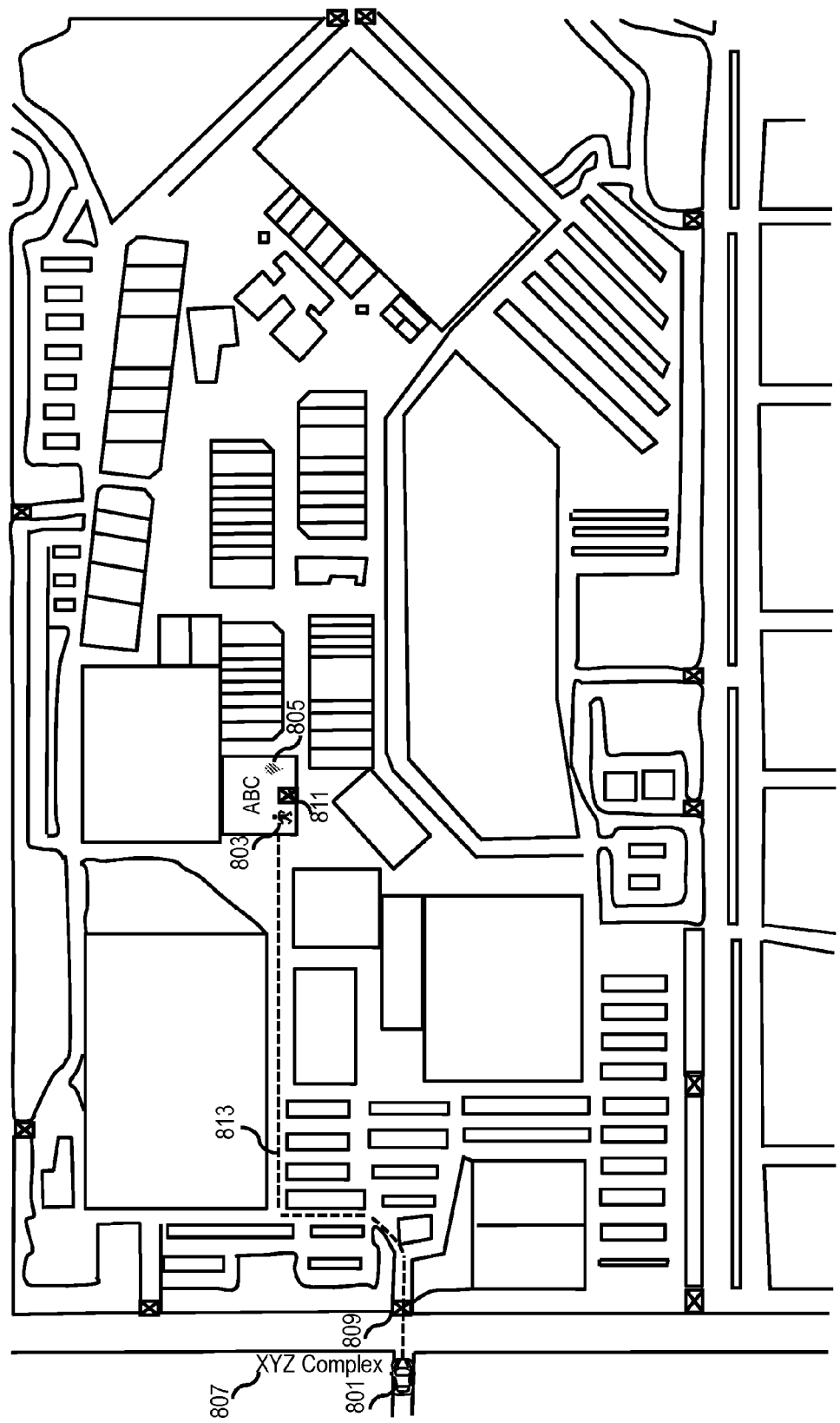
FIG. 8 is a diagram that represents a scenario wherein at least one user is granted access to a restricted access area, according to one example embodiment.

FIG. 8 is a diagram that represents a scenario wherein at least one user is granted access to a restricted access area, according to one example embodiment. In one scenario, the access management platform 109 may check for existence of any area with restricted access in at least one suggested route towards at least one destination. If it is detected that some areas need specific access rights, then the access management platform 109 may propose the most intuitive way to retrieve those access rights to make this experience seamless. In one example embodiment, user A (801) may set user B's (803) residential address (805) as the destination. Then, the access management platform 109 may cause a presentation of at least one notification in the navigation application of user A (801), for instance, "the system has detected that specific access rights are needed to enter the XYZ area (807) and then the building ABC (805), would you like to send access request to user B (803) through the navigation application?." Once user A (801) approves transmittal of the access request, User B (803) may see in his/her UE 101 a request for entering the XYZ area (807) as well as the ABC building (805). The request may also include estimated time of arrival for user A (801). The user B (803) may accept the request with one click and may set a time window of validity for the access credentials. When user B (803) grants access for the XYZ area (807) and/or the ABC building (805), the access management platform 109 may unlock the (indoor) map data for the restricted access area so that user A (801) has the necessary information to navigate inside this restricted access area upon arrival. Subsequently, when user A (801) arrives close to the destination, he/she may use his/her UE 101 to access the restricted access areas, using the most appropriate method, for instance, near field communication, PIN input, quick response codes, etc. In one scenario, user A (801) may be asked to enter a PIN code when entering the gateway (809) and when entering ABC building's gateway (811). In another example embodiment, user B (803) may accept the request, or deny the request, or may not be able to respond on time. Then, the access management platform 109 may cause a presentation of this relevant information in user A's (801) UE 101. In one scenario, when user B (803) accepts the request, then the access management platform 109 may cause a notification that the end to end route is now unlocked till the destination. Further, the access management platform 109 may cause a presentation of colored routes, wherein the unlocked route (813) may appear in green color in at least one UE 101 (e.g., a navigation system). In another scenario, if the request for access is still pending, the access management platform 109 may cause a notification in the at least one UE 101 for user A (801) to take corrective actions, for example, cancel the trip, delay his/her arrival, call user B, and so on. In a further scenario, user B (803) may deny access to the restricted area, whereupon the access management platform 109 may cause a notification in at least one UE 101 that user B (803) is not available for visit and/or the navigation needs to be stopped. As an alternate, the access management platform 109 may propose a route to user A's (801) home if he/she already started driving, or a route till the entrance of the gated area if the user continues to drive towards user B's (803) residence.

Figure 9:
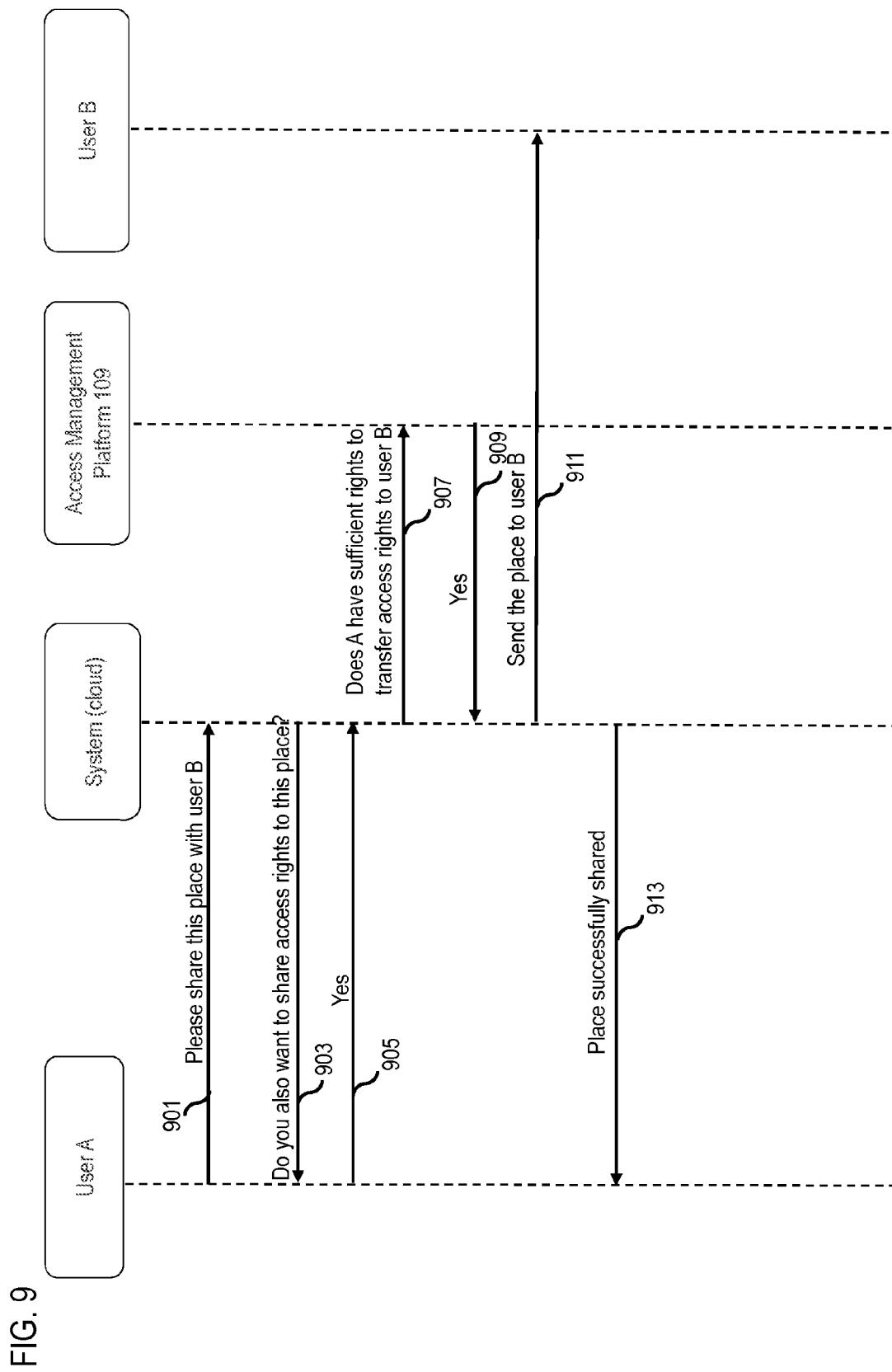
FIG. 9 is a ladder diagram that represents a scenario wherein location information and/or mapping information for at least one restricted access area is shared with at least one external user, according to one example embodiment.

FIG. 9 is a ladder diagram that represents a scenario wherein location information and/or mapping information for at least one restricted access area is shared with at least one external user, according to one example embodiment. In step 901, user A shares location information via his/her UE 101 to user B, whereupon the system (cloud) may detect that the shared location is within a restricted access area (e.g., a gated area). In step 903, the system may ask user A whether he/she wants to grant the needed access rights to user B to reach the restricted access area. In step 905, user A may grant access information to user B by responding positively to the access request. In step 907, the system may check with the access management platform 109 on whether user A has the necessary rights to grant access to the restricted areas (e.g., does user A live in the restricted access area?). The system may optionally query regarding the details about the validity of the access grant (e.g., the access granted may expire after a day, a week, the estimated time of arrival, etc.). In step 909, the access management platform 109 may determine that user A has sufficient rights, and may convey this information to the system (cloud). In step 911, the system may inform user B that user A has granted access rights, and may also send mapping information pertaining to the restricted access area for correct navigation. The system may also provide information on the possible limitations mentioned, i.e., possible validity period. In step 913, the system may inform user A that the location information and the access credentials have been successfully shared with user B.

Figure 10:
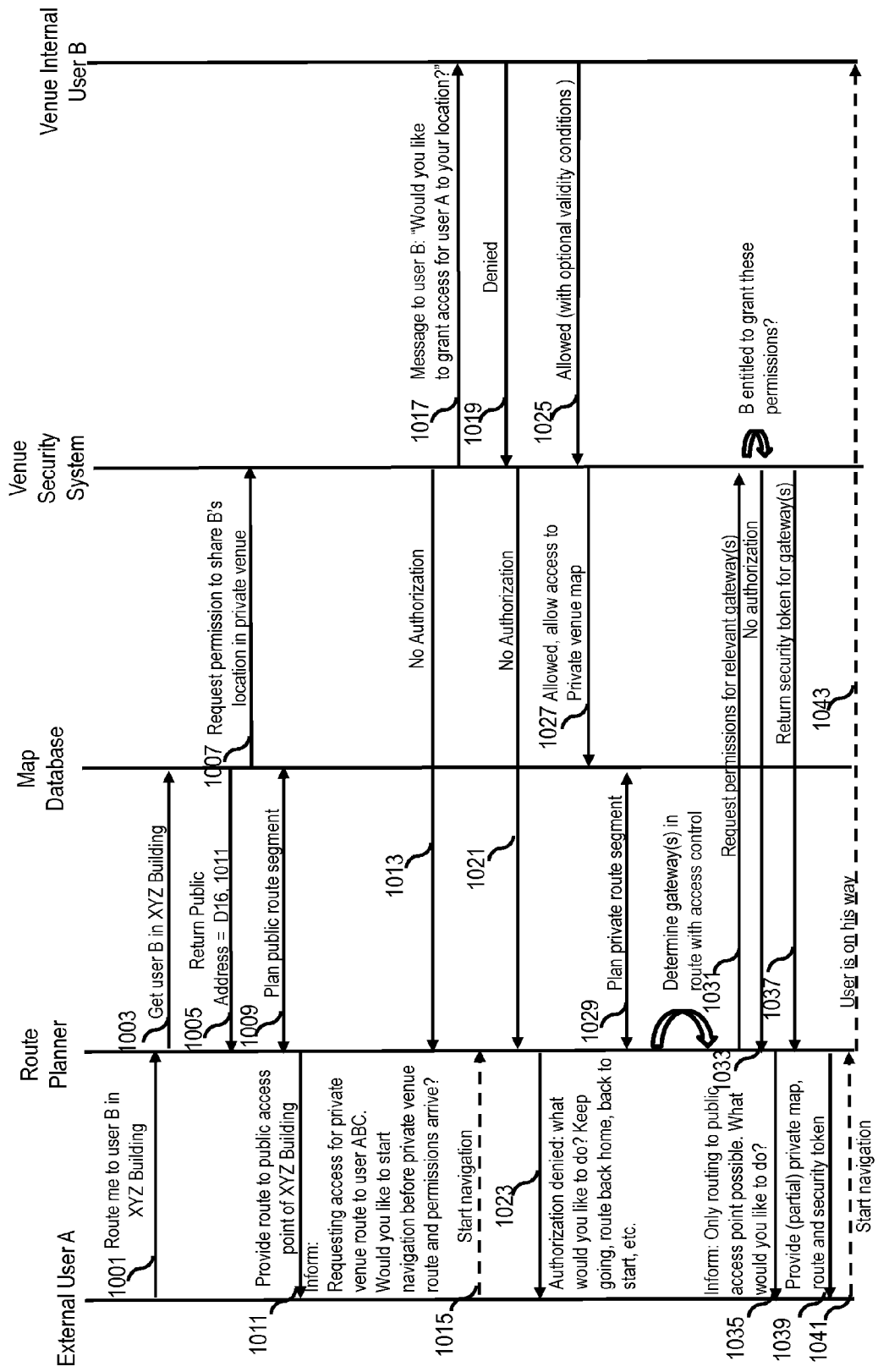
FIG. 10 is a ladder diagram that represents a scenario wherein at least one external user plans to enter a restricted access area, according to one example embodiment.

FIG. 10 is a ladder diagram that represents a scenario wherein at least one external user plans to enter a restricted access area, according to one example embodiment. In step 1001, user A may request a route planner to navigate towards user B's residence. Subsequently, the route planner may request the residential address for user B from the map database (step 1003). In step 1005, the map database may provide the route planner with the public address information towards user B's residence. In step 1007, the map database may request the venue security system for permission to share user B's private venue information. In step 1009, the route planner and the map database may plan the public route segment towards user B's residence (XYZ building). Then, the route planner provides the route towards the public access point of user B's residence to user A in his/her UE 101 (step 1011). In addition, user A may be notified by the route planner regarding the option to start navigation before permission for the private venue route is granted. In step 1013, the venue security system may not grant authorization to user A to access private venue route towards user B's residence for security reasons. In step 1015, user A initiates navigation towards the public access point of user B's residence with the knowledge that he/she does not have access credentials to enter the restricted access area. In step 1017, the venue security system sends a message to user B if he/she would like to grant access to user A to the restricted access area. In step 1019, user B refuses to grant access to user A. Subsequently, the venue security system notifies the route planner that an authorization for the restricted access area cannot be granted to user A (step 1021). Then, in Step 1023, the route planner may notify user A on the available options (e.g., keep going, route back home, back to start, etc.) as the authorization to access has been denied. In step 1025, user B changes his/her mind and decide to grant access to user A under optional validity conditions. Then, in step 1027, the venue security system sends a notification to the map database that user B has allowed access to the restricted access area to user A. Consequently, the map database shares the private venue map with the route planner and plans the private route segment (step 1029). This process also involves determining one or more entrances (e.g., gates) with access control. In step 1031, the route planner sends a request to the venue security system for permission to access the relevant gateways to the restricted access area. Then, the venue security system determines whether user B has the authority to grant permission to access the relevant gateways to user A. In one scenario, if user B does not have the authority to grant access, then user A can route and access only the public access points (steps 1033 and 1035). In another scenario, if user B has the authority, then the venue security system may provide the route planner with access credentials (e.g., security tokens) (step 1037). Subsequently, the route planner may provide user A with private maps, private routes and the security token (step 1039). Then, user A may resume navigation towards user B's residence (step 1041). In step 1043, the route planner may notify user B on the progression of user A during the course of his/her travel.

Figure 11:
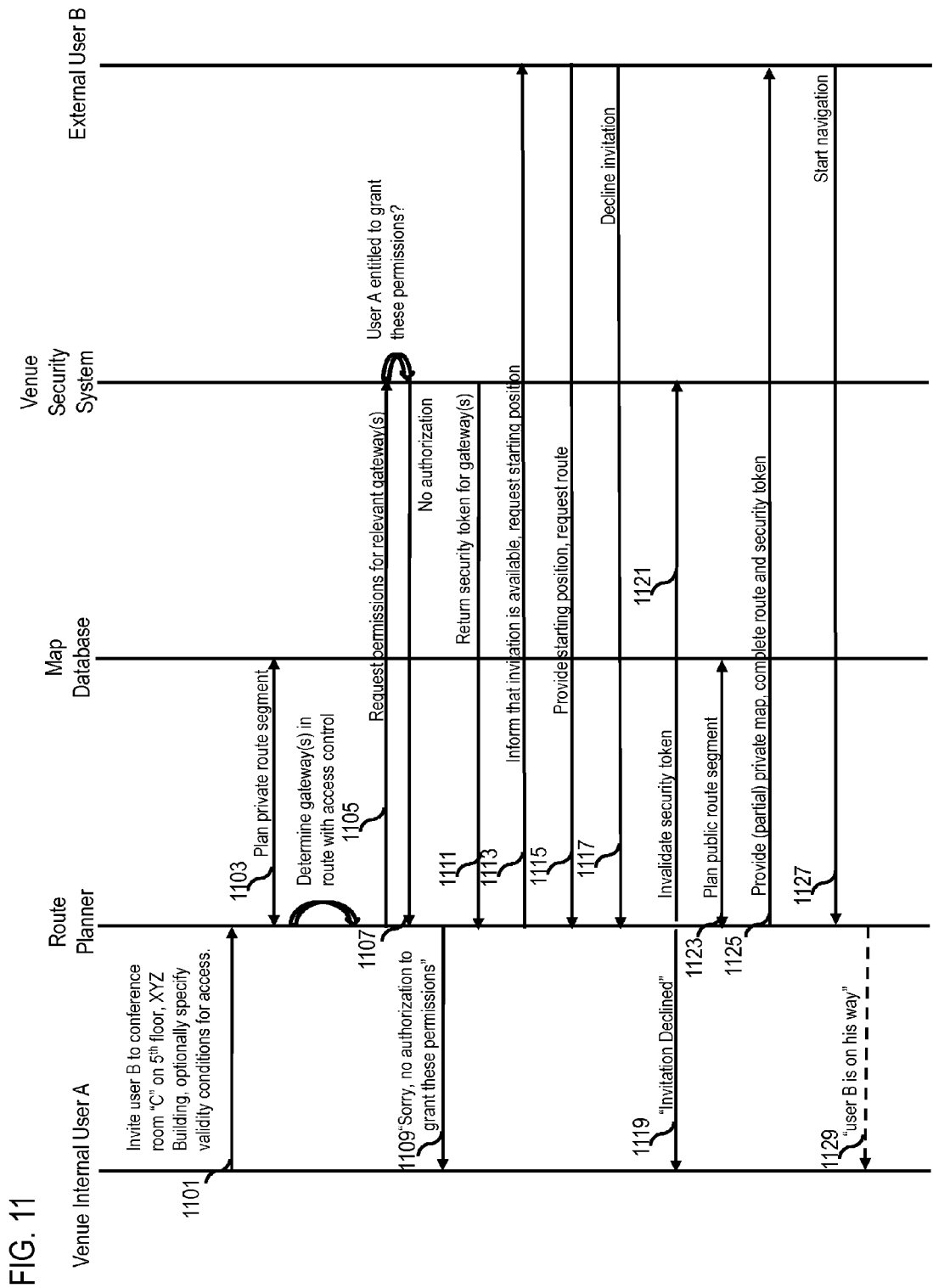
FIG. 11 is a ladder diagram that represents a scenario wherein an authorized user invites an external user to the restricted access area, according to one example embodiment.

FIG. 11 is a ladder diagram that represents a scenario wherein an authorized user invites an external user to the restricted access area, according to one example embodiment. In step 1101, user A may send a request to the route planner to invite user B to the conference room on the 5$^{th}$ floor of the XYZ building. The request may optionally specify validity conditions for accessing the XYZ building and/or the conference room. In step 1103, the route planner may request the address information for XYZ building from the map database. The map database may provide the route planner with the address information (both public and private), whereupon the route planner and the map database may plan the private route segment towards XYZ building. This process also involves determining one or more entrances (e.g., gates) with access control. In step 1105, the route planner may send a request to the venue security system for permission to access the relevant gateways to the restricted access area. Then, the venue security system determines whether user A has the authority to grant permission to access the relevant gateways to user B. In one scenario, if the venue security system determines that user A does not have the authority to grant the access, then the venue security system may notify the route planner that no permission can be granted (step 1107). Subsequently, the route planner may notify user A in his/her UE 101 that no permission can be granted because user A does not have the authority to grant access (step 1109). In another scenario, if user A has the authority, then the venue security system may provide the route planner with access credentials (e.g., security tokens) (step 1111). In step 1113, the route planner may notify external user B that an invitation to the XYZ building is available. In addition, the route planner may also request for information pertaining to the starting position of user B. So, user B may either accept the invitation (step 1115) or decline the invitation (steps 1117, 1119, and 1121). In one scenario, if user B accepts the invitation, he/she may provide information on the starting point and may request for the routing information from the starting point to the XYZ building (step 1115). Then, the route planner and the map database may plan a public route segment (step 1123), and may provide user B with partial private maps, complete route and the security token (step 1125). Subsequently, user B may initiate navigation towards XYZ building (step 1127). In step 1129, the route planner may notify user A on the progression of user B during the course of his/her travel towards XYZ building.

The processes described herein for acquiring access rights for one or more restricted access areas may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 12:
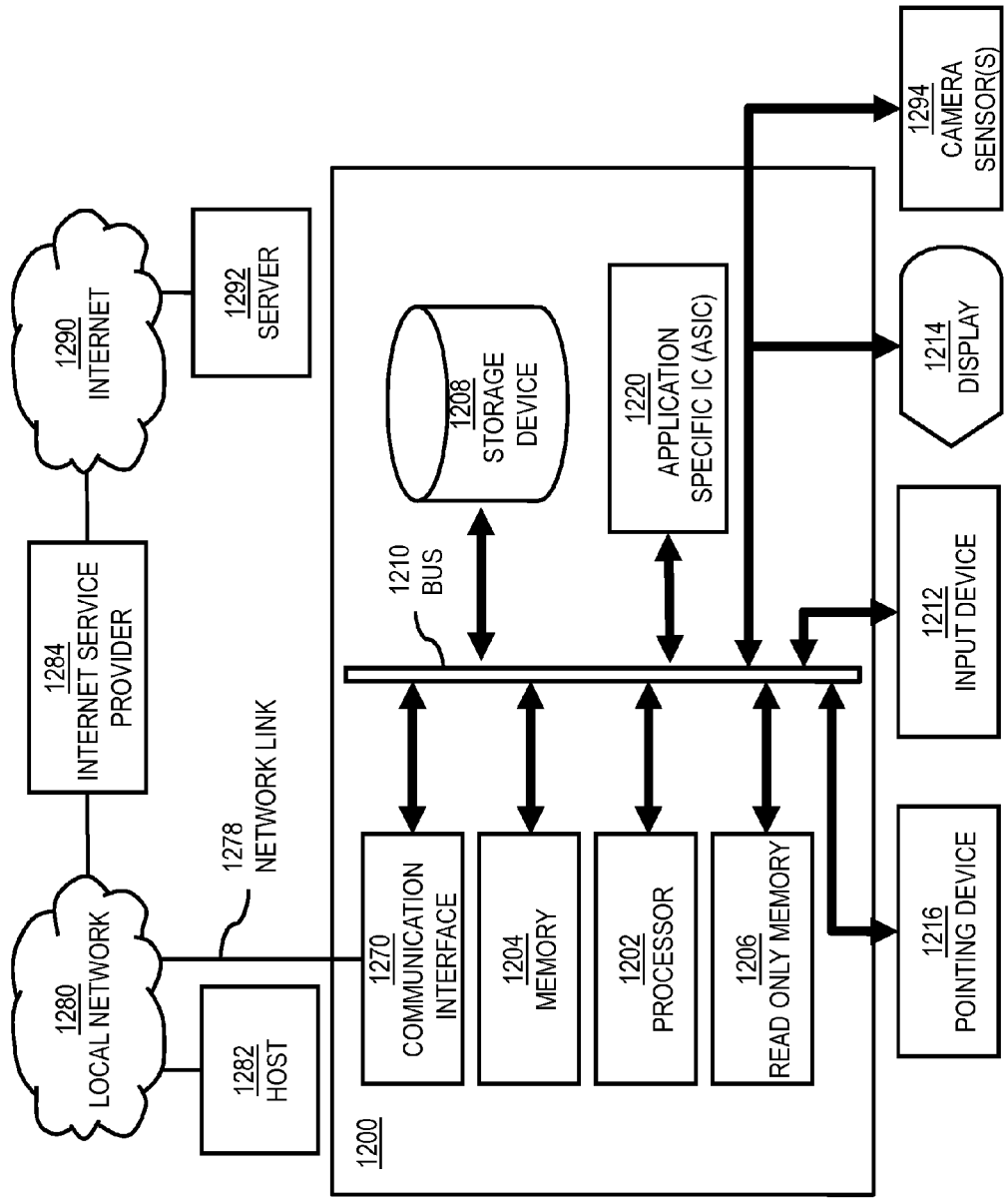
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to acquire access rights for one or more restricted access areas as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of acquiring access rights for one or more restricted access areas.

A bus 1210 includes one or more parallel conductors of information so that information is transferred quickly among devices coupled to the bus 1210. One or more processors 1202 for processing information are coupled with the bus 1210.

A processor (or multiple processors) 1202 performs a set of operations on information as specified by computer program code related to acquire access rights for one or more restricted access areas. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1200 also includes a memory 1204 coupled to bus 1210. The memory 1204, such as a random access memory (RAM) or any other dynamic storage device, stores information including processor instructions for acquiring access rights for one or more restricted access areas. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or any other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for acquiring access rights for one or more restricted access areas, is provided to the bus 1210 for use by the processor from an external input device 1212, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT), a liquid crystal display (LCD), a light emitting diode (LED) display, an organic LED (OLED) display, a plasma screen, or a printer for presenting text or images, and a pointing device 1216, such as a mouse, a trackball, cursor direction keys, or a motion sensor, for controlling a position of a small cursor image presented on the display 1214 and issuing commands associated with graphical elements presented on the display 1214, and one or more camera sensors 1294 for capturing, recording and causing to store one or more still and/or moving images (e.g., videos, movies, etc.) which also may comprise audio recordings. In some embodiments, for example, in embodiments in which the computer system 1200 performs all functions automatically without human input, one or more of external input device 1212, display device 1214 and pointing device 1216 may be omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of ASICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 107 for acquiring access rights for one or more restricted access areas to the UE 101.

The term "computer-readable medium" as used herein refers to any medium that participates in providing information to processor 1202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1208. Volatile media include, for example, dynamic memory 1204. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or any other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

FIG. 13 illustrates a chip set or chip 1300 upon which an embodiment of the invention may be implemented. Chip set 1300 is programmed to acquire access rights for one or more restricted access areas as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1300 can be implemented in a single chip. It is further contemplated that in certain embodiments the chip set or chip 1300 can be implemented as a single "system on a chip." It is further contemplated that in certain embodiments a separate ASIC would not be used, for example, and that all relevant functions as disclosed herein would be performed by a processor or processors. Chip set or chip 1300, or a portion thereof, constitutes a means for performing one or more steps of providing user interface navigation information associated with the availability of functions. Chip set or chip 1300, or a portion thereof, constitutes a means for performing one or more steps of acquiring access rights for one or more restricted access areas.

In one embodiment, the chip set or chip 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1300 includes merely one or more processors and some software and/or firmware supporting and/or relating to and/or for the one or more processors.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to acquire access rights for one or more restricted access areas. The memory 1305 also stores the data associated with or generated by the execution of the inventive steps.

Figure 14:
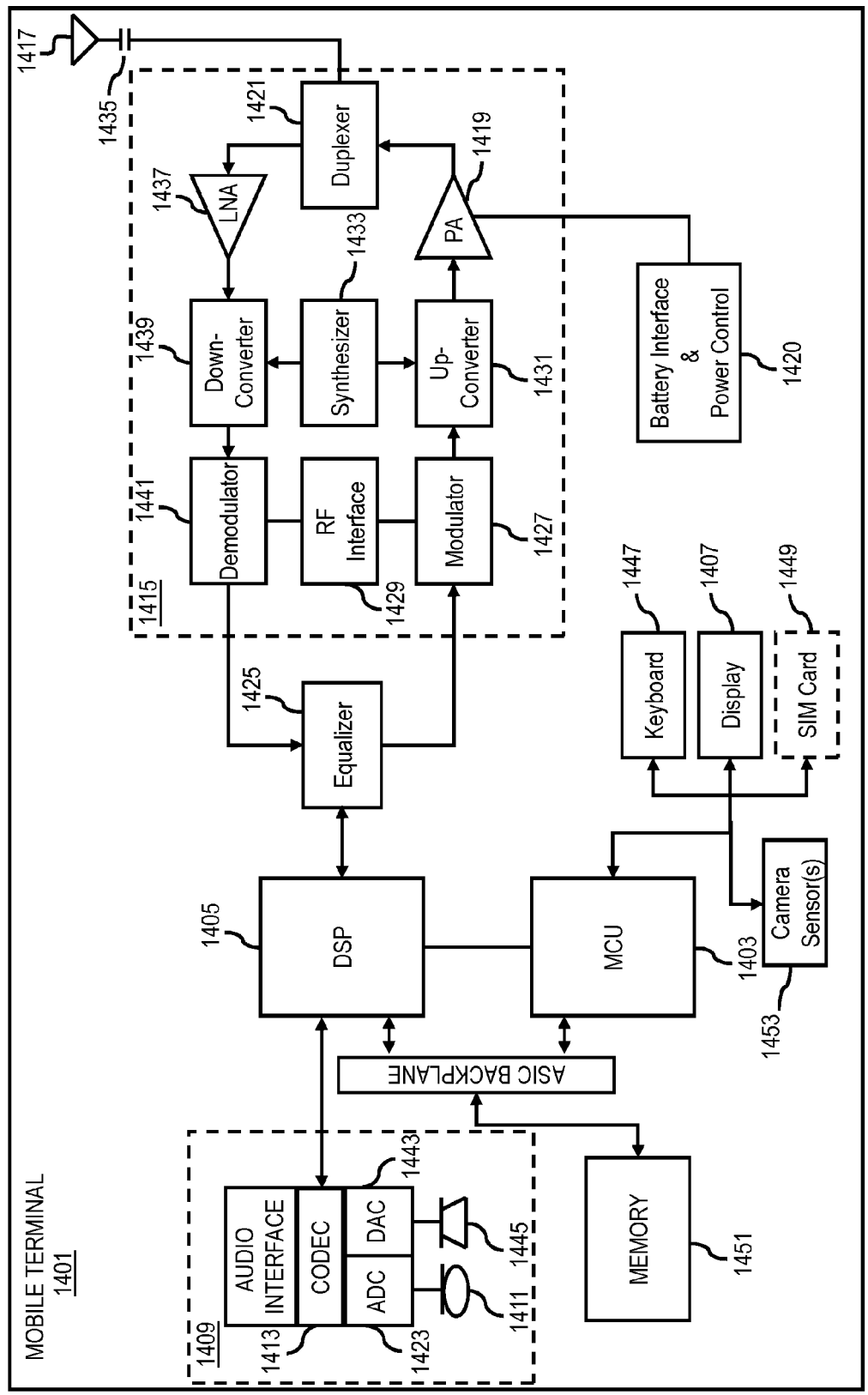
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1A, according to one embodiment. In some embodiments, mobile terminal 1401, or a portion thereof, constitutes a means for performing one or more steps of acquiring access rights for one or more restricted access areas. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of acquiring access rights for one or more restricted access areas. The display 1407 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403 which can be implemented as a Central Processing Unit (CPU).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to acquire access rights for one or more restricted access areas. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

Further, one or more camera sensors 1453 may be incorporated onto the mobile station 1401 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining that at least one potential route for at least one user includes at least a portion without access restriction and at least one location with one or more access restrictions;
   initiating at least one query to determine whether the at least one user has at least one access right to the at least one location; and
   generating at least one request to acquire the at least one access right for the at least one user based on a result of the at least one query indicating that the at least one user does not have that at least one access right to that at least one location,
   wherein the at least one request is generated prior to a commencement of the at least one potential route that includes the at least a portion without access restriction and the at least one location with one or more access restrictions.

2. A method of claim 1, further comprising:
   determining one or more available paths in the at least one location based, at least in part, on the one or more access restrictions, the at least one access right, or a combination thereof; and
   causing, at least in part, a presentation of the one or more available paths in at least one navigation user interface.

3. A method of claim 1, further comprising:
   determining one or more parties capable of granting the at least one access right to the at least one user; and
   transmitting the at least one request to the one or more parties.

4. A method of claim 3, further comprising:
   receiving a response from the one or more parties indicating that the at least one access right is granted to the at least one user; and
   initiating a transmission of at least one private map of the at least one location to the at least one user based, at least in part, on the response.

5. A method of claim 4, wherein the transmission of the at least one private map further includes, at least in part, one or more access credentials for use by the at least one user for travel in the at least one location.

6. A method comprising:
   determining that at least one potential route for at least one user includes at least one location with one or more access restrictions;
   initiating at least one query to determine whether the at least one user has at least one access right to the at least one location;
   generating at least one request to acquire the at least one access right for the at least one user based, at least in part, on one or more results of the at least one query prior to travel in the at least one location, a commencement of the at least one potential route, or a combination thereof; and
   receiving a request from the one or more parties to share the at least one potential route, at least one place associated with the at least one potential route, or a combination thereof with the at least one user,
   wherein the initiating of the at least one query, the generating of the at least one request to acquire the at least one access right, a transmission of the at least one potential route or the at least one place to the at least one user, or a combination thereof is based, at least in part, on determining whether the one or more parties are authorized to share the at least one route, to grant the at least one access right, or a combination thereof.

7. A method of claim 1, wherein the one or more access restrictions, the at least one access right, or a combination thereof is based, at least in part, on one or more validity parameters, one or more contextual parameters, or a combination thereof, the method further comprising:
   causing, at least in part, a presentation of the one or more validity parameters, the one or more contextual parameters, or a combination thereof.

8. A method of claim 1, further comprising:
   causing, at least in part, a presentation of one or more representations of the one or more access restrictions, the at least one access right, the at least one potential route, a status of the at least one request to acquire the at least one access right, or a combination thereof in at least one navigation user interface.

9. A method comprising:
determining that at least one potential route for at least one user includes at least one location with one or more access restrictions;
initiating at least one query to determine whether the at least one user has at least one access right to the at least one location;
generating at least one request to acquire the at least one access right for the at least one user based, at least in part, on one or more results of the at least one query prior to travel in the at least one location, a commencement of the at least one potential route, or a combination thereof; and
causing a presentation of one or more alternate routes, at least one notification message, or a combination thereof if the at least one request to acquire the at least one access right is not granted.

10. A method of claim 1, further comprising:
determining one or more means for initiating the at least one request to acquire the at least one access right based, at least in part, on the at least one location, the one or more access restrictions, the at least one potential route, contextual information, or a combination thereof.

11. An apparatus comprising:
at least one processor; and
at least one memory including computer program code for one or more programs,
the at least one memory and the computer program code configured to, with the at least one processor, cause the apparatus to perform at least the following,
determine that at least one potential route for at least one user includes at least a portion without access restriction and at least one location with one or more access restrictions;
initiate at least one query to determine whether the at least one user has at least one access right to the at least one location; and
generate at least one request to acquire the at least one access right for the at least one user based a result of the at least one query indicating that the at least one user does not have that at least one access right to that at least one location,
wherein the at least one request is generated prior to a commencement of the at least one potential route that includes the at least a portion without access restriction and the at least one location with one or more access restrictions.

12. An apparatus of claim 11, wherein the apparatus is further caused to:
determine one or more available paths in the at least one location based, at least in part, on the one or more access restrictions, the at least one access right, or a combination thereof; and
cause, at least in part, a presentation of the one or more available paths in at least one navigation user interface.

13. An apparatus of claim 11, wherein the apparatus is further caused to:
determine one or more parties capable of granting the at least one access right to the at least one user; and
transmit the at least one request to the one or more parties.

14. An apparatus of claim 13, wherein the apparatus is further caused to:

receive a response from the one or more parties indicating that the at least one access right is granted to the at least one user; and
initiate a transmission of at least one private map of the at least one location to the at least one user based, at least in part, on the response.

15. An apparatus of claim 14, wherein the transmission of the at least one private map further includes, at least in part, one or more access credentials for use by the at least one user for travel in the at least one location.

16. An apparatus comprising:
at least one processor; and
at least one memory including computer program code for one or more programs,
the at least one memory and the computer program code configured to, with the at least one processor, cause the apparatus to perform at least the following,
determine that at least one potential route for at least one user includes at least one location with one or more access restrictions;
initiate at least one query to determine whether the at least one user has at least one access right to the at least one location;
generate at least one request to acquire the at least one access right for the at least one user based, at least in part, on one or more results of the at least one query prior to travel in the at least one location, a commencement of the at least one potential route, or a combination thereof; and
receive a request from the one or more parties to share the at least one potential route, at least one place associated with the at least one potential route, or a combination thereof with the at least one user,
wherein the initiating of the at least one query, the generating of the at least one request to acquire the at least one access right, a transmission of the at least one potential route or the at least one place to the at least one user, or a combination thereof is based, at least in part, on determining whether the one or more parties are authorized to share the at least one route, to grant the at least one access right, or a combination thereof.

17. An apparatus of claim 11, wherein the one or more access restrictions, the at least one access right, or a combination thereof is based, at least in part, on one or more validity parameters, one or more contextual parameters, or a combination thereof, the method further comprising:
cause, at least in part, a presentation of the one or more validity parameters, the one or more contextual parameters, or a combination thereof.

18. A non-transitory computer-readable storage medium carrying one or more sequences of one or more instructions which, when executed by one or more processors, cause an apparatus to at least perform the following steps:
determining that at least one potential route for at least one user includes at least a portion without access restriction and at least one location with one or more access restrictions;
initiating at least one query to determine whether the at least one user has at least one access right to the at least one location; and
generating at least one request to acquire the at least one access right for the at least one user based on a result of the at least one query indicating that the at least one user does not have that at least one access right to that at least one location, wherein the at least one request is generated prior to a commencement of the at least one potential route that includes the at least a portion without access restriction and the at least one location with one or more access restrictions.

19. A non-transitory computer-readable storage medium of claim 18, wherein the apparatus is further caused to:
determining one or more available paths in the at least one location based, at least in part, on the one or more access restrictions, the at least one access right, or a combination thereof; and
causing, at least in part, a presentation of the one or more available paths in at least one navigation user interface.

20. A non-transitory computer-readable storage medium of claim 18, wherein the apparatus is further caused to:
determining one or more parties capable of granting the at least one access right to the at least one user; and
transmitting the at least one request to the one or more parties.

* * * * *

UNITED STATES PATENT AND TRADEMARK OFFICE
CERTIFICATE OF CORRECTION

PATENT NO. : 9,719,789 B2
APPLICATION NO. : 14/949389
DATED : August 1, 2017
INVENTOR(S) : Jerome Beaurepaire It is certified that error appears in the above-identified patent and that said Letters Patent is hereby corrected as shown below:

On the Title Page

Item (73), the Assignee information which reads:
"HERE GLBOAL B.V."

Should read:
"HERE Global B.V."

Signed and Sealed this
Third Day of October, 2017

Joseph Matal
*Performing the Functions and Duties of the*
*Under Secretary of Commerce for Intellectual Property and*
*Director of the United States Patent and Trademark Office*